United States Patent
Cohrs et al.

(10) Patent No.: US 8,196,104 B2
(45) Date of Patent: Jun. 5, 2012

(54) SYSTEMS AND METHODS FOR TESTING APPLICATION ACCESSIBILITY

(75) Inventors: Christian Cohrs, Roemerberg (DE); Alexey Medvedev, Nussloch (DE); Christian Jendel, Sinsheim (DE); Wolfgang Roeder, Nussioch (DE)

(73) Assignee: SAP AG, Walldorf (DE)

( * ) Notice: Subject to any disclaimer, the term of this patent is extended or adjusted under 35 U.S.C. 154(b) by 1047 days.

(21) Appl. No.: 11/214,937

(22) Filed: Aug. 31, 2005

(65) Prior Publication Data

US 2007/0074167 A1 Mar. 29, 2007

(51) Int. Cl.
*G06F 9/44* (2006.01)

(52) U.S. Cl. ......... 717/124; 717/125; 717/126; 717/127

(58) Field of Classification Search .................... 717/124
See application file for complete search history.

(56) References Cited

U.S. PATENT DOCUMENTS

| | | | | |
|---|---|---|---|---|
| 6,681,383 B1 * | 1/2004 | Pastor et al. | ................... | 717/126 |
| 6,775,824 B1 * | 8/2004 | Osborne et al. | ............... | 717/125 |
| 6,918,066 B2 * | 7/2005 | Dutta et al. | ..................... | 714/46 |
| 7,203,928 B2 * | 4/2007 | Mandava et al. | ............... | 717/124 |
| 7,490,319 B2 * | 2/2009 | Blackwell et al. | ............ | 717/124 |
| 7,519,953 B2 * | 4/2009 | Reissman et al. | .............. | 717/124 |
| 7,840,944 B2 * | 11/2010 | Brunswig et al. | ............. | 717/124 |
| 7,950,004 B2 * | 5/2011 | Vieira et al. | ................... | 717/125 |
| 2002/0085037 A1 | 7/2002 | Leavitt et al. | | |
| 2002/0156799 A1 | 10/2002 | Markel et al. | | |
| 2002/0178007 A1 | 11/2002 | Slotznick et al. | | |
| 2003/0210266 A1 | 11/2003 | Cragun et al. | | |
| 2004/0117248 A1 | 6/2004 | Dutta et al. | | |
| 2004/0117278 A1 | 6/2004 | Dutta et al. | | |
| 2004/0117279 A1 | 6/2004 | Dutta et al. | | |
| 2004/0117370 A1 | 6/2004 | Dutta et al. | | |
| 2004/0139370 A1 * | 7/2004 | Bailey et al. | ..................... | 714/38 |
| 2004/0148568 A1 | 7/2004 | Springer | | |
| 2004/0158429 A1 | 8/2004 | Bary et al. | | |
| 2004/0218451 A1 | 11/2004 | Said et al. | | |
| 2005/0223363 A1 * | 10/2005 | Black-Ziegelbein et al. | .. | 717/127 |
| 2006/0070035 A1 * | 3/2006 | Ulrich et al. | ................... | 717/124 |
| 2006/0156286 A1 * | 7/2006 | Morgan et al. | ................ | 717/124 |
| 2006/0195819 A1 * | 8/2006 | Chory et al. | ................... | 717/117 |
| 2008/0127103 A1 * | 5/2008 | Bak | ................ | 717/126 |
| 2008/0155508 A1 * | 6/2008 | Sarkar et al. | .................. | 717/126 |

OTHER PUBLICATIONS

Feigenbaum et al., Accessibility validation with RAVEN, May 2006, pp. 27-32, <http://delivery.acm.org/10.1145/1140000/1137709/p27-feigenbaum.pdf>.*

Stone et al., Proving the validity and accessibility of dynamic webpages, Jun. 2003, pp. 13-14, <http://delivery.acm.org/10.1145/1040000/1036407/p13-stone.pdf>.*

(Continued)

*Primary Examiner* — Thuy Dao
(74) *Attorney, Agent, or Firm* — Finnegan, Henderson, Farabow, Garrett & Dunner, LLP (57) ABSTRACT

Systems, methods, and computer program products consistent with the invention expose semantic information for the user interface elements of an application at runtime as part of a rich object model and check accessibility requirements compliance, such as Section 508 compliance, for each user screen or other user-interface that the application presents. In some embodiments, accessibility checks are based at least in part on the context of the user interface elements as exposed through the object model.

20 Claims, 6 Drawing Sheets

OTHER PUBLICATIONS

E. Gibson, Web accessibility and section 508 compliance, May 2002, pp. 257-259, <http://delivery.acm.org/10.1145/780000/775787/p257-gibson.pdf>.*

Hyun et al., An active step toward a web content accessible society, May 2005, pp. 55-59, <http://delivery.acm.org/10.1145/1070000/1061821/p55-hyun.pdf>.*

Watchfire® Bobby™ 5.0, http://watchfire.com, "Web Accessibility Testing" copyright 2002 (4 pages) (downloaded May 6, 2005).

Bobby—Web Accessibility Testing, Watchfire®, ,http://www.watchfire.com/products/desktop/bobby/default.aspx> (1 page) (accessed May 6, 2005).

* cited by examiner

SYSTEMS AND METHODS FOR TESTING APPLICATION ACCESSIBILITY

FIELD OF THE INVENTION

The present invention generally relates to testing software applications. More particularly, the invention relates to systems and methods for automatically determining whether a software application is accessible for disabled users.

BACKGROUND

Until recently, most computer applications were designed primarily to be used by people without disabilities—people that can see, hear, operate a mouse and keyboard, and distinguish colors without difficulty. Computer application interface design practices changed in 2001, after the U.S. Congress amended Section 508 of the Rehabilitation Act to require U.S. Federal Government ("Federal")agencies to make their electronic and information technology accessible to people with disabilities and corresponding rules came into effect.

The primary purpose of Section 508 is to foster access to and use of Federal executive agencies' electronic and information technology (EIT) by individuals with disabilities. EIT includes information technology (IT), and any equipment or interconnected system or subsystem of equipment, that is used in the creation, conversion, or duplication of data or information. This includes any system used for communication, duplication, computing, storage, presentation, control, transport or production of information, such as computers, software applications, networks, web sites, peripherals and other types of electronic office equipment. Inaccessible technology interferes with an individual's ability to obtain and use data or information quickly and easily. Section 508 is designed to eliminate barriers in information technology, to make available new opportunities for people with disabilities, and to encourage development of technologies that will help achieve these goals. The law applies to all Federal agencies when they develop, buy, maintain, or use electronic and information technology. Under Section 508, agencies must give disabled employees and members of the public access to information that is comparable to the access available to others.

Although Section 508 does not directly apply to the private sector, because of the magnitude of federal purchasing power—federal agencies generally must purchase electronic and information technology that is Section 508 compliant—many EIT producers design their products for compliance. Thus, in one sense, Section 508 promotes accessibility competition in the technology industry by clarifying the federal market's requirement for accessibility in products intended for general use. Companies interested in selling EIT to the Federal government are responsible for designing and manufacturing products that meet the applicable Section 508 provisions. For example, if two companies are bidding a government contract and one is offering accessible solutions and the other is not, the accessible technology is likely to win the contract.

The technical standards of Section 508 provide criteria specific to various types of technologies, including software applications and operating systems, web-based information, and desktop and portable computers, among others. The standards provide both technical specifications and performance-based requirements that focus on the functional capabilities of covered technologies. Certain provisions are designed to ensure compatibility with adaptive equipment that people with disabilities commonly use for information and communication access, such as screen readers, Braille displays, and TTYs.

Most of the standards for software applications pertain to usability for people with vision impairments. For example, one provision requires alternative keyboard navigation, which is essential for people with vision impairments who cannot rely on pointing devices, such as a mouse. Other provisions address animated displays, color and contrast settings, flash rate, and electronic forms, among other things.

The provisions for web-based technology and information are intended to ensure access for people with vision impairments who rely on various assistive products to access computer-based information, such as screen readers, which translate the contents of a computer screen into automated audible output, and refreshable Braille line displays, which are a tactile devices consisting of a row of special 'soft' cells having 6 or 8 pins that are controlled electronically to move up and down to form Braille characters as they appear on the display of a source system, such as a computer. Certain conventions, such as verbal tags or identification of graphics, and format devices, like frames, are necessary so that these products can "read" them for the user in a sensible way. The standards do not prohibit the use of graphics or animation. Instead, the standards try to ensure that graphic and animation information is also available in another accessible format. Generally, this means use of text labels or descriptors for graphics and certain format elements. For example, HTML code provides an "Alt Text" tag for graphics which can serve as a verbal descriptor for graphics. The standards also addresses the usability of multimedia presentations, image maps, style sheets, scripting languages, applets and plug-ins, and electronic forms.

To comply with Section 508, software application designers and implementers, including web site designers and implementers, must meet the set of functional standards that require, for example, that there be a way for a person who is mobility-impaired or blind to use the software product or Web site. More specifically, the Section 508 standards require a web site or application user interface to satisfy sixteen items for accessibility. These are specific things a web site or application must do to ensure that a person who is mobility impaired, blind, or otherwise impaired can use the application. For example, the standards require the use of alternative text for images and the use of client-side image maps instead of server-side maps.

Because of the purchasing power of the Federal government, among other things, many EIT vendors try to incorporate accessibility features into their products and service offerings, both new and existing. Many problems arise, however, in testing a software application or other product for compliance with Section 508 or other accessibility standard. Testing an application that has a rich user interface, for example, requires an enormous effort and a large amount of money to determine whether each user-interface element of each display screen meets accessibility compliance goals. Testing is even more problematic for an application featuring screens with user-interface elements that are assembled dynamically, as compliance checks must be done at runtime because static representations of the screens do not exist.

One possible solution is to manually test all the possible user-interface screens and elements for accessibility compliance. Companies, however, often lack the resources to, or cannot profitably, test all their products manually.

Another possible solution is to employ conventional tools, such as Bobby (http://www.watchfire.com/products/desktop/bobby/default.aspx), to test simple user-interface elements, such as those found in HTML pages, for accessibility problems. Such conventional tools, however, cannot test rich user interfaces or consider the context of an element in a dynamically assembled user-interface display because they operate at the HTML level and are limited to the information provided by an HTML page.

Accordingly, it is desirable to develop systems and methods that are capable of testing a rich-user-interface application for compliance with accessibility standards, including context evaluation of the elements. It is also desirable to develop systems and methods for testing applications for accessibility, such as Section 508 compliance, during the applications' development phase, evaluating the accessibility status of an application during acceptance testing, and integrating the accessibility checks into an automatic application test that emulates end user interaction.

SUMMARY OF THE INVENTION

Systems, methods, and computer program product embodiments consistent with the invention expose semantic information for the user interface elements of an application at runtime as part of an object model and check accessibility requirements compliance, such as Section 508 compliance or compliance with the guidelines of the World Wide Web Consortium Web Accessibility Initiative (W3C WAI), for each user interface element that the application displays. In some embodiments, accessibility checks are based at least in part on the context of the user interface elements as exposed through the object model.

Implementations of systems, methods, and computer programs consistent with the invention for testing for accessibility an application having source code contain components for and perform operations comprising: providing a set of accessibility rules; analyzing the source code of the application; generating an object model representing the application based on the source code analysis; testing an object from the object model to determine compliance with the set of accessibility rules; and presenting a result of the testing.

Other implementations of systems, methods, and computer programs for a product validation product consistent with the invention comprise: an object model generator that analyzes the source code of a software application and generates an object model representing the application; an accessibility checking tool that tests each object from the object model to determine compliance with a set of accessibility rules and reports a test result; and an application object model exerciser that operates the object model such that essentially all objects from the object model are tested by the accessibility checking tool.

Advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts.

Figure 1:
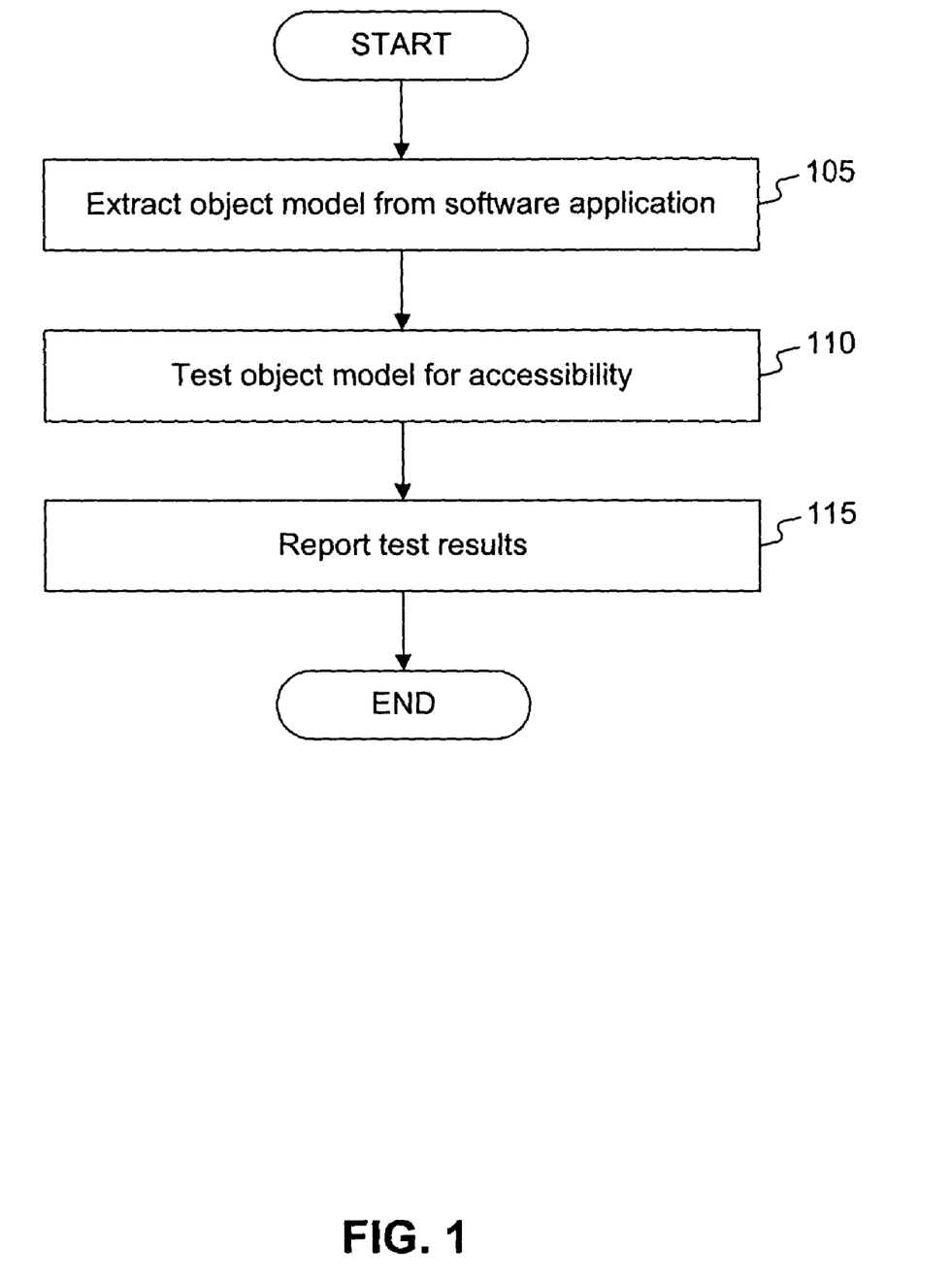
FIG. 1 is a flowchart of an exemplary process for testing application accessibility consistent with the invention.

FIG. 1 is a flowchart of an exemplary process for testing application accessibility consistent with one implementation of the invention. The process may be implemented wholly or partly using data-processing hardware, software, manual operations, or some combination of these. As shown, the process begins with extracting an object model from a software application (stage 105). An object model is a specification of the objects intrinsic to a given application and may include a description of each object's characteristics and a description of the static and dynamic relationships that exist between objects. An object model may include a formal description of each programmable object in the application, which may consist of one or more classes, events, functions, interfaces, methods, namespaces, objects, and properties. In one embodiment consistent with the invention, the object model of an application is limited to objects related to the user-interface of the application, for example, objects that create or perform functions related to text, controls, or graphics on a user display screen. If the object model is limited, it should not be limited to the extent that it excludes meaningful information about the application state.

In one embodiment, the object model is generated based on the screen description that the server sends to the client. If, for example, the server sends a button as part of the screen description, the properties of the button can be accessed from an external application using a communications interface. For the button example, the following properties may be available:

AccLabelCollection: The collection contains objects of type GuiLabel that were assigned to this control in the ABAP Screen Painter;

AccText: An additional text for accessibility support;

AccTextOnRequest: An additional text for accessibility support;

AccTooltip: An additional tooltip text for accessibility support;

Changeable: An object is changeable if it is neither disabled nor read-only;

ContainerType: This property is TRUE, if the object is a container and therefore has the children property;

DefaultTooltip: Tooltip text generated from the short text defined in the data dictionary for the given screen element type;

Height: Height of the component in pixels;

IconName: If the object has been assigned an icon, then this property is the name of the icon, otherwise it is an empty string;

Id: An object id is a unique textual identifier for the object. It is built in a URL-like formatting, starting at the GuiApplication object and drilling down to the respective object;

IsSymbolFont: The property is TRUE if the component's text is visualized in the SAP symbol font;

LeftLabel: Left label of the component. The label is assigned in the screenpainter, using the flag 'assign left';

Modified: An object is modified if its state has been changed by the user and this change has not yet been sent to the SAP system;

Name: The name property is especially useful when working with simple scripts that only access dynpro fields. In that case a field can be found using its name and type information, which is easier to read than a possibly very long id; However, there is no guarantee that there are no two objects with the same name and type in a given dynpro;

Parent: The parent of an object is one level higher in the runtime hierarchy. An object is always in the children collection of its parent;

ParentFrame: If the control is hosted by the Frame object, the value of the property is this frame. Overwise NULL;

RightLabel: Right label of the component. This property is set in screenpainter using the 'assign right' flag;

ScreenLeft: The y position of the component in screen coordinates;

ScreenTop: The x position of the component in screen coordinates;

Text: The value of this property very much depends on the type of the object on which it is called. This is obvious for text fields or menu items. On the other hand this property is empty for toolbar buttons and is the class id for shells. You can read the text property of a label, but you can't change it, whereas you can only set the text property of a password field, but not read it;

Tooltip: The tooltip contains a text which is designed to help a user understand the meaning of a given text field or button;

Type: The type information of GuiComponent can be used to determine which properties and methods an object supports. The value of the type string is the name of the type taken from this documentation;

TypeAsNumber: While the type property is a string value, the typeAsNumber property is a long value that can alternatively be used to identify an object's type. It was added for better performance in methods such as Find-ByldEx. Possible values for this property are taken from the GuiComponentType enumeration; and Width: Width of the component in pixels.

Next, the process tests the object model for accessibility (stage 110). In one embodiment consistent with the invention, testing for accessibility involves testing whether the user-interface-related objects in the object model meet the requirements of a set of accessibility standards, provisions, or requirements, such as the Section 508 standards. For example, the process may determine whether a control button object that includes a method(s) for displaying a control button labeled with an icon, (e.g., a button with a picture of a floppy disk that causes an application to save a user's work when activated), also includes a method for displaying a text tooltip, which is needed for screen reader accessibility. As shown in the example of button properties above, the process may check, for example, the properties for "icon name" and "tooltip" to determine whether an icon and a tooltip exist for the button. Similarly, the process can also determine whether a label was assigned or not using the object properties.

After the object model is tested, the process reports the results of the testing (stage 115). This may be done by printing a report, displaying the results on a user screen display, transmitting data to another process or application, or by various other ways known to those skilled in the art.

Figure 2:
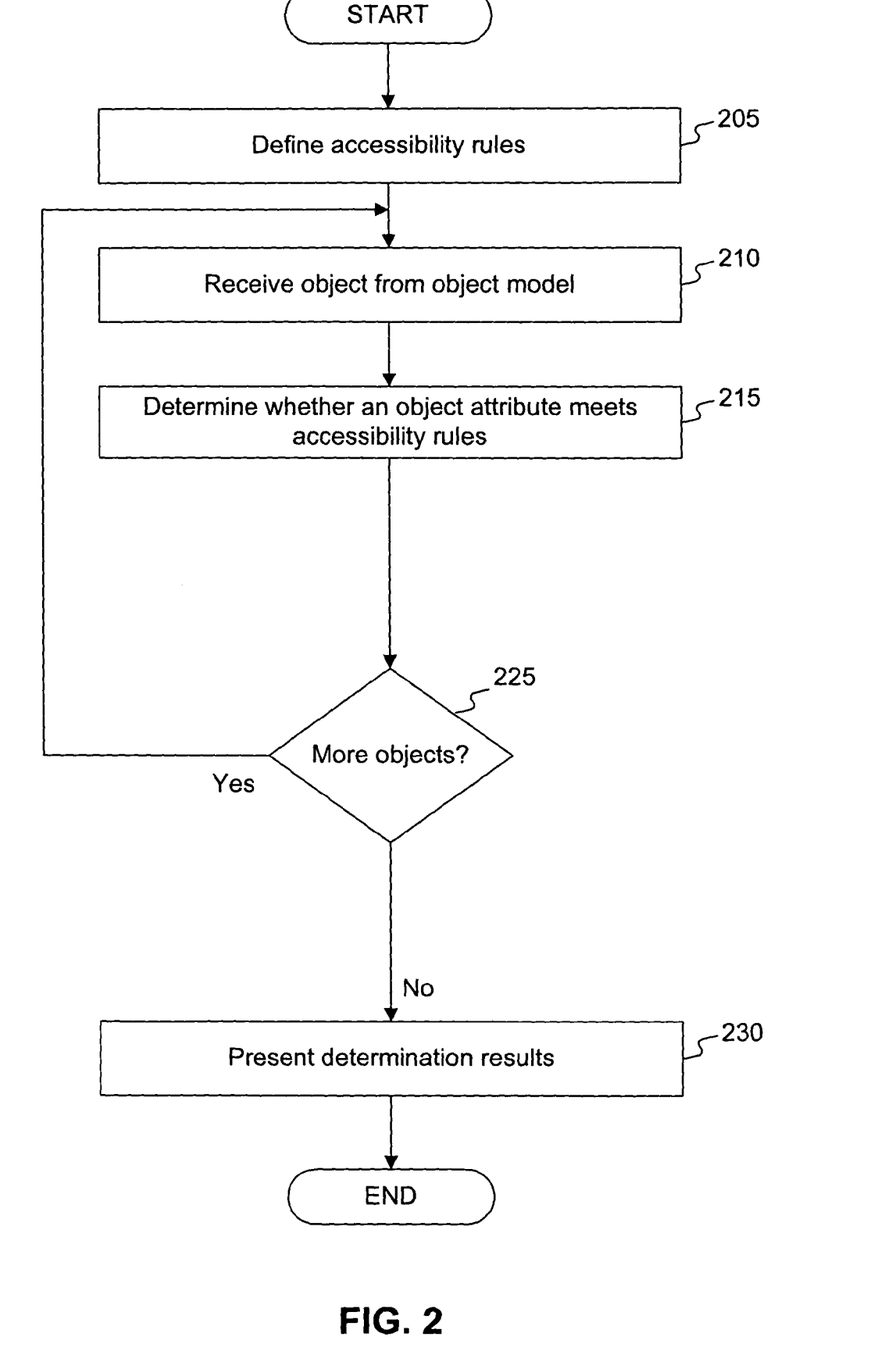
FIG. 2 is a flowchart of an exemplary process for testing an object model consistent with the invention.

FIG. 2 is a flowchart of an exemplary process for testing an object model consistent with the invention. The process may be implemented wholly or partly using data-processing hardware, software, manual operations, or some combination of these. As shown, the process begins with defining rules that will be used to test an application object model for accessibility compliance (stage 205).

In one embodiment consistent with the invention, the accessibility rules are custom designed to test whether the objects in the object model provide accessibility to handicapped or disabled users. For example, a rule may be that an object may not generate a frame within an existing frame because this may be confusing to blind users and screen reader devices and applications. For another example, a rule may be that checking a check box control cannot change the whole screen, again because this may be confusing to blind users and screen reader devices and applications. In yet another example, a rule may be that there must be some way, in addition to highlighting, to indicate where the current focus is because blind users cannot see which frame, control, etc. is highlighted.

In another embodiment consistent with the invention, the accessibility rules are designed to test compliance with a set of accessibility standards, provisions, or requirements, such as the Section 508 standards. For example, the accessibility rules may be designed to test compliance with the Section 508 standards as illustrated in Table 1.

TABLE 1

| Section 508 Standard | Accessibility Rule Example |
| --- | --- |
| (a) A text equivalent for every non-text element shall be provided (e.g., via "alt", "longdesc", or in element content). | Every image, Java applet, Flash file, video file, audio file, plug-in, etc. has an alt description. |
| As above | Complex graphics (graphs, charts, etc.) are accompanied by detailed text descriptions conveying the meaning of the graphic. |
| As above | The alt descriptions succinctly describe the purpose of the objects, without being too verbose (for simple objects) or too vague (for complex objects) or redundant (e.g. the alt text is the same as the text immediately preceding or following it in the document). |

TABLE 1-continued

| Section 508 Standard | Accessibility Rule Example |
| --- | --- |
| As above | Alt descriptions for images used as links are descriptive of the link destination. |
| As above | Decorative graphics with no other function have empty alt descriptions (alt = ""), but they do not have missing alt descriptions or descriptions that say "spacer", "decorative graphic," or other titles that only increase the time that it takes to listen to a page when using a screen reader. |
| (b) Equivalent alternatives for any multimedia presentation shall be synchronized with the presentation. | Multimedia files have synchronized captions. |
| (c) Web pages shall be designed so that all information conveyed with color is also available without color, for example from context or markup. | If color is used to convey important information, an alternative indicator is used, such as an asterisk (*) or other symbol, so the use of a color monitor is not required. |
| As above | Contrast is good. |
| (d) Documents shall be organized so they are readable without requiring an associated style sheet. | Style sheets may be used for color, indentation and other presentation effects, but the document is still understandable (even if less visually appealing) when the style sheet is turned off. |
| (e) Redundant text links shall be provided for each active region of a server-side image map. | Separate text links are provided outside of the server-side image map to access the same content that any image map hot spots access, making a mouse unnecessary and the links available to assistive technologies. |
| (f) Client-side image maps shall be provided instead of server-side image maps except where the regions cannot be defined with an available geometric shape. | Client-side image maps are used, and appropriate alt text is provided for the image as well as the hot spots. |
| (g) Row and column headers shall be identified for data tables. | Data tables have the column and row headers appropriately identified (using the <th> tag) |
| As above | Tables used strictly for layout purposes do NOT have header rows or columns. |
| (h) Markup shall be used to associate data cells and header cells for data tables that have two or more logical levels of row or column headers. | Table cells are associated with the appropriate headers (e.g. with the id, headers, scope and/or axis HTML attributes). |
| (i) Frames shall be titled with text that facilitates frame identification and navigation. | Each frame is given a title that helps the user understand the frame's purpose. |
| (j) Pages shall be designed to avoid causing the screen to flicker with a frequency greater than 2 Hz and lower than 55 Hz. | No elements on the page flicker at a rate of 2 to 55 cycles per second, thus reducing the risk of optically-induced seizures. |
| (k) A text-only page, with equivalent information or functionality, shall be provided to make a web site comply with the provisions of this part, when compliance cannot be accomplished in any other way. The content of the text-only page shall be updated whenever the primary page changes. | A text-only version is created only when there is no other way to make the content accessible, or when it offers significant advantages over the "main" version for certain disability types. |
| As above | The text-only version is up-to-date with the "main" version. |
| As above | The text-only version provides the functionality equivalent to that of the "main" version. |
| As above | An alternative is provided for components (e.g. plug-ins, scripts) that are not directly accessible. |
| (l) When pages utilize scripting languages to display content, or to create interface elements, the information provided by the script shall be identified with functional text that can be read by assistive technology. | Information within the scripts is text-based, or a text alternative is provided for graphics-as-text within the script itself, in accordance with (a) in the Section 508 standards. |
| As above | All scripts (e.g., Javascript pop-up menus) are either directly accessible to assistive technologies (e.g., keyboard accessible), or an alternative method of accessing equivalent functionality is provided (e.g. a standard HTML link). Scripts work without a mouse |
| (m) When a web page requires that an applet, plug-in or other application be present on the client system to interpret page content, the page must provide a link to a plug-in or applet that complies with §1194.21(a) through (1). | A link is provided to a disability-accessible page where the plug-in can be downloaded, and the download page is disability-accessible. |

TABLE 1-continued

| Section 508 Standard | Accessibility Rule Example |
| --- | --- |
| As above | All Java applets, scripts and plug-ins (e.g., Acrobat PDF files, PowerPoint files, etc.) and the content within them are accessible to assistive technologies, or else an alternative means of accessing equivalent content is provided. |
| (n) When electronic forms are designed to be completed on-line, the form shall allow people using assistive technology to access the information, field elements, and functionality required for completion and submission of the form, including all directions and cues. | All form controls have text labels adjacent to them. |
| As above | Form elements have labels associated with them in the markup (e.g., the id and for, HTML elements). |
| As above | Dynamic HTML scripting of the form does not interfere with assistive technologies. |
| (o) A method shall be provided that permits users to skip repetitive navigation links. | A link is provided to skip over lists of navigational menus or other lengthy lists of links. |
| (p) When a timed response is required, the user shall be alerted and given sufficient time to indicate more time is required. | The user has control over the timing of content changes, and is not required to react within limited time restraints. |

In one embodiment consistent with the invention, the accessibility rules may be changed without changing the test engine that uses the rules, thus changing the testing of the object model of the application with minimal effort.

As shown in FIG. 2, the process next receives an object from the object model of the application (stage 210), and then the process determines whether the object complies with the accessibility rules (stage 215). As noted above, the accessibility rules may be custom designed, designed to test compliance with Section 508, or some combination of the two. In some embodiments consistent with the invention, determining whether an object meets the accessibility rules may involve testing each attribute of the object, and upon finding certain conditions, performing additional tests.

Object model testing of an application's user interface provides thorough testing because the object model contains useful semantic information relating to the meaning of an object, instruction, attribute, etc., in addition to the basic format information available from other models. Thus, implementations consistent with the invention may test the functioning of interface elements for rules compliance using the semantic information to determine the context of the element. For example, the testing application may follow function calls from a control object to an object invoked by the control, e.g., navigating through an object tree. HTML-type testing, for example, cannot perform context testing, such as testing what a control does, because an HTML-level model merely looks at the elements finally rendered on a screen, while an object model can test the underlying objects that create the final screen output. That is, at the HTML level, a control is merely a graphic element on the screen that is not much different than other graphic elements, and that does not contain the semantic information necessary to test it fully with respect to its control functionality, among other things. At the object model level, on the other hand, a control object can be recognized for what it is, and tested accordingly. For example, object model testing may determine whether checking a checkbox control violates an accessibility rule requiring that checking a checkbox cannot change the entire display screen. Similarly, object model testing may determine whether a frame is displayed within another frame, perhaps in violation of an accessibility rule prohibiting frames within frames. For another example, object model testing has access to information indicating whether a screen element is in a table or not and can apply different rules that apply to table elements or non-table elements. HTML-screen-level testing cannot perform such tests. Yet another example is a tabstrip control. In HTML, this is rendered as a set of tables, so the semantics of the control are lost. In an object model consistent with the invention, the actual type of the control is retained and the process can apply the matching rules.

Next, the process determines whether there are more objects in the object model to be tested (stage 225). If so (225, Yes) the process loops to receive another object from the object model and test it.

If not, (225, No), the process presents the results regarding whether the objects in the object model comply with the accessibility rules (stage 230).

Processes consistent with the invention, such as the processes illustrated in FIGS. 1 and 2, may be used to test applications for Section 508 compliance during development phase by development teams and to evaluate the accessibility status of an application during acceptance tests, among other things. Such processes may also be integrated into an automatic application test that emulates end user interaction with a software application.

Figure 3:
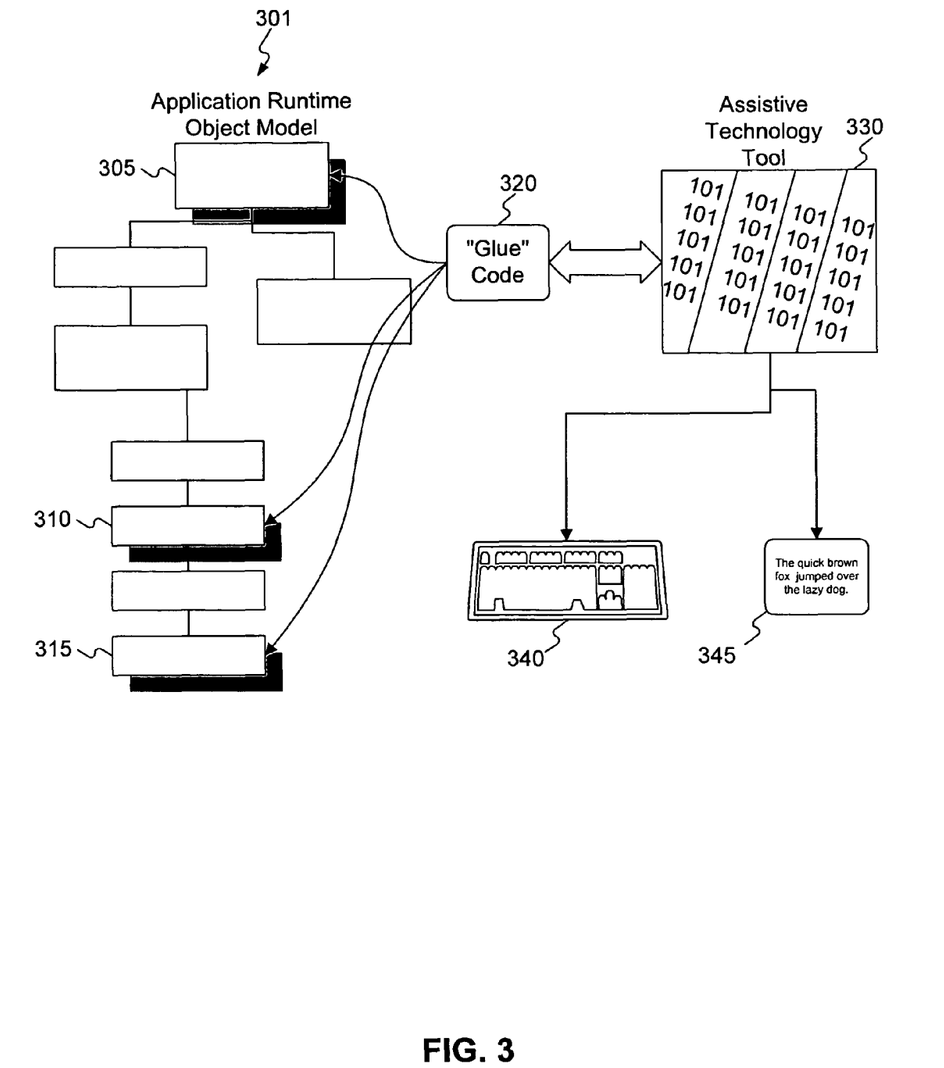
FIG. 3 is a block diagram of an exemplary system architecture for an accessibility solution consistent with the principles of the invention.

FIG. 3 is a block diagram of an accessibility solution architecture consistent with the principles of the invention. Such an architecture may be used by a user with special needs, as it allows connection of an assistive technology, such as a screenreader application, to an application runtime object model 301. As explained above, in one embodiment, object model 301 may include a description of the object characteristics and a description of the static and dynamic relationships that exist between objects in the application, including the objects related to the user-interface of the application, such as object 305, object 310, and object 315.

In the implementation shown, an assistive technology tool 330, such as a Braille keyboard application for a Braille interface 340 (e.g., the Braille In™ keyboard by Sighted Electronics, Inc., a Braille keyboard by Hooleon Corp., or a Braille line display by Baum Retec AG or F.G. Papenmeier GmbH & Co. KG) or a screen reader application for a display screen 345 (e.g., the JAWS™ screen reader by Freedom Scientific Corp., the LOOKout™ screen reader by Choice Technology, Inc., or the Virgo™ screen reader by Baum Retec AG), is used to access an object model. Because assistive technology tool 330 is not designed to work with an object model, such as object model 301, interface or "glue" code 320 is used to interface between the two. Interface code 320 may be a custom application that makes the interface to application runtime object model 301 appear and react as the normal interface to assistive technology tool 330, such as an HTML interface.

In the system architecture shown in FIG. 3, a person manually operates assistive technology tool 330 to test the accessibility of application runtime object model 301. In one embodiment consistent with the invention, the person testing may both execute steps in the application (via application runtime object model 301) and evaluate the output of assistive technology tool 330 to determine whether the application complies with accessibility requirements. In one embodiment, the tester may determine compliance by checking whether a Braille interface 340, a screen reader 345, or other assistive technology tool 330 operates correctly. In this implementation, noncompliance with accessibility requirements and other detected issues, such as any incompleteness of runtime object model 301, may be reported manually by the person testing.

Figure 4:
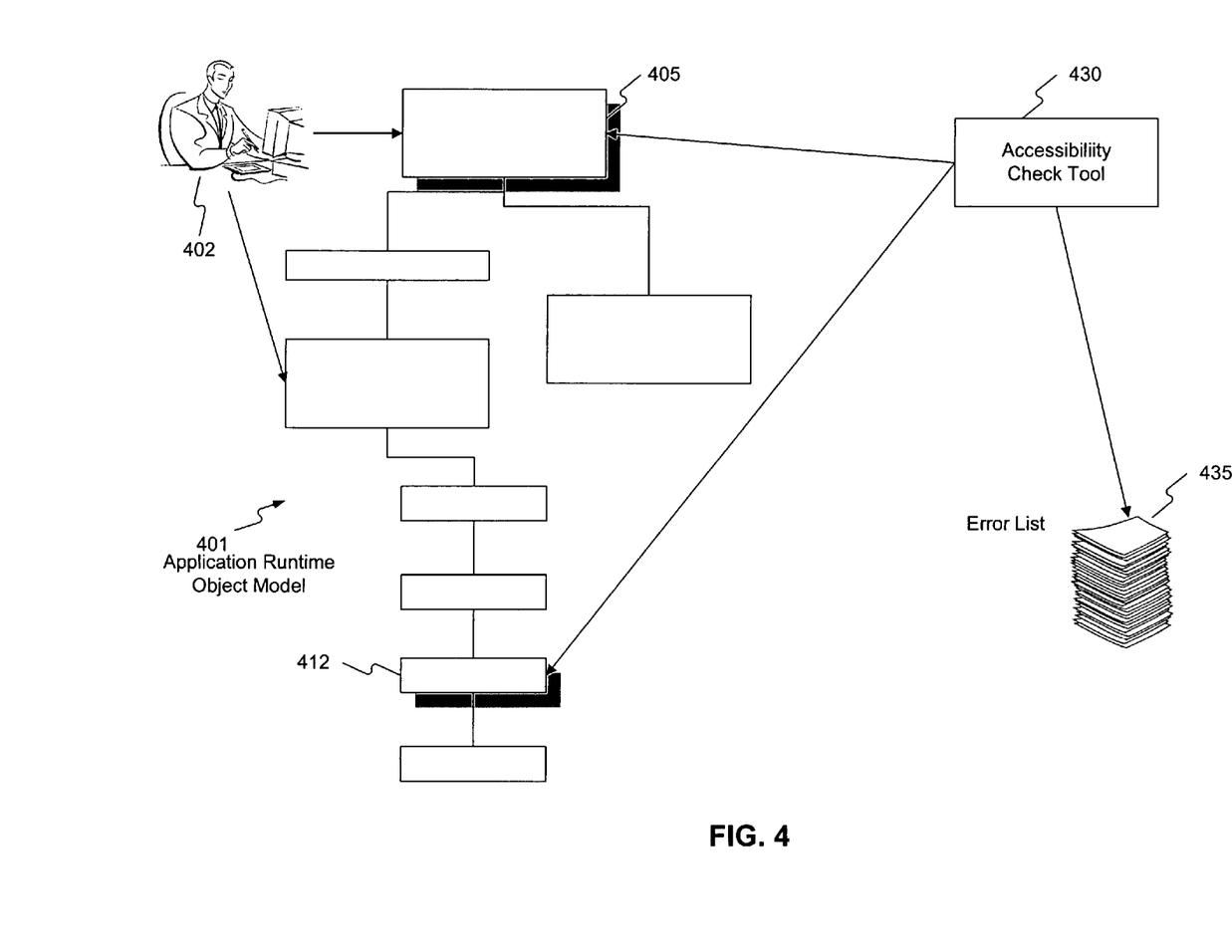
FIG. 4 is a block diagram of an exemplary system architecture for performing accessibility testing of an application consistent with the principles of the invention.

FIG. 4 is a block diagram of an exemplary system architecture for performing accessibility testing of an application consistent with the principles of the invention. As shown, an application runtime object model 401 is used for testing. As explained previously, in one embodiment, object model 401 may include a description of the object characteristics and a description of the static and dynamic relationships that exist between objects in the application, including the objects related to the user-interface of the application, such as object 405 and object 412.

In this implementation, application runtime object model 401 is tested automatically by accessibility check tool 430. Unlike the architecture shown in FIG. 3, which requires running the application runtime model 401 as a handicapped user would (e.g., with an assistive technology tool such as an audio screenreader, Braille line display, etc.), the architecture shown in FIG. 4 does not require an assistive technology tool for testing. Accessibility check tool 430 is an application that retrieves user-interface-related objects, such as object 405 and object 412, from object model 401 and determines whether the user-interface-related objects meet accessibility requirements. In one implementation, accessibility check tool 430 performs a process similar to the processes depicted in FIGS. 1 and 2. In the implementation shown, accessibility check tool 430 reports the results of its determination via an error list 435, which may be a hardcopy, database entries, or electronic data.

Application runtime object model 401 is operated manually by a person 402. Person 402 should run application runtime object model 401 through all its states and operations so the all user-interface elements, including dynamically configured elements, may be tested for accessibility.

Figure 5:
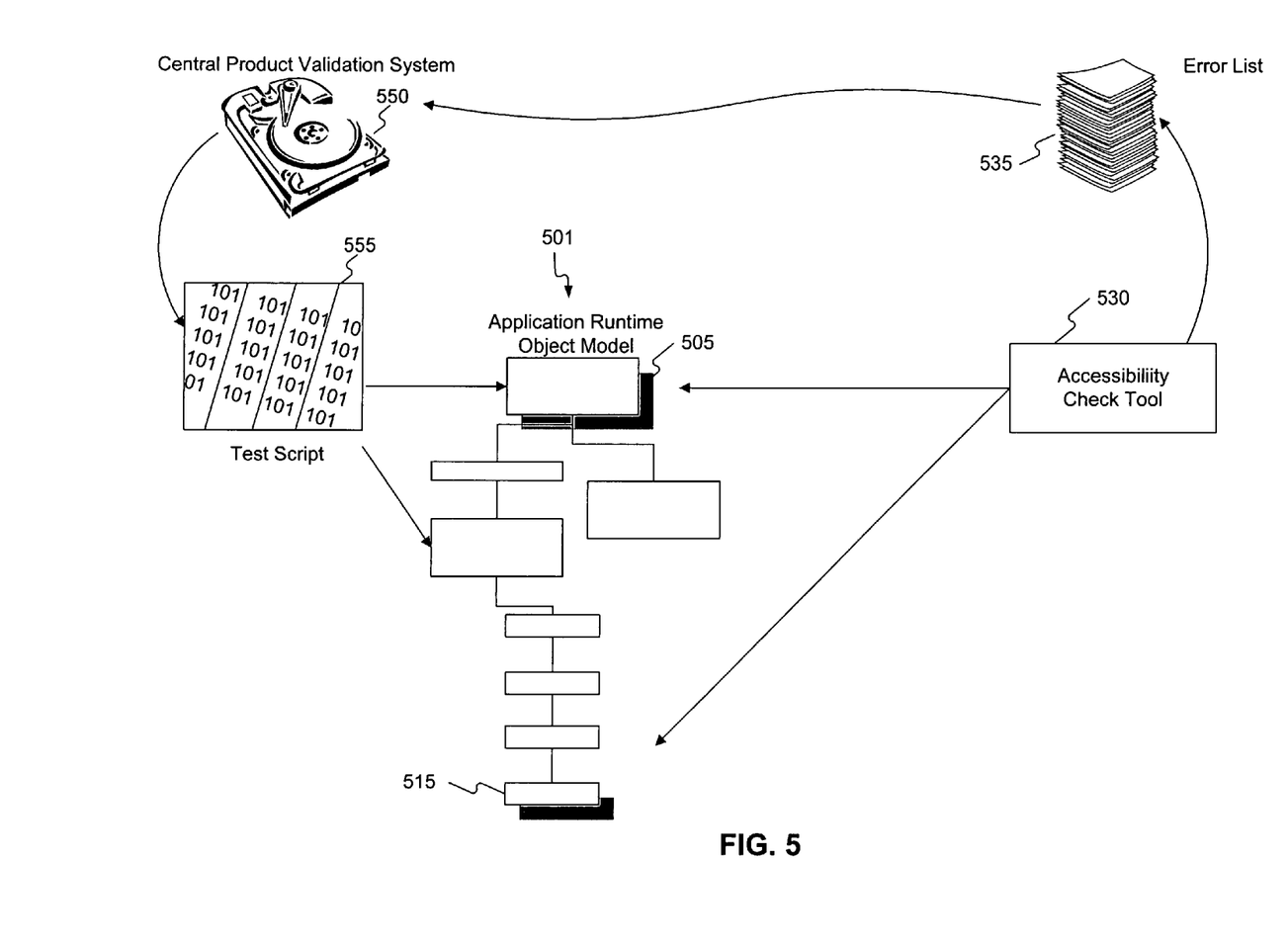
FIG. 5 is a block diagram of another exemplary system architecture for performing accessibility testing of an application consistent with the principles of the invention.

FIG. 5 is a block diagram of another exemplary system architecture for performing accessibility testing of an application consistent with the principles of the invention. As shown, an application runtime object model 501 is used for testing. As explained previously, in one embodiment, object model 501 may include a description of the object characteristics and a description of the static and dynamic relationships that exist between objects in the application, including the objects related to the user-interface of the application, such as object 505 and object 515.

In this implementation, manual operation of application runtime object model 501 may be replaced by automatic operation performed by an application running a server-based test script 555 guided by a central product validation system 550. This architecture allows central validation system 550 to initiate automatic full loop testing of application runtime object model 501 for compliance with accessibility requirements.

As in the architecture shown in FIG. 4, the architecture of FIG. 5 includes an accessibility check tool 530 for automatically testing application runtime object model 501. Accessibility check tool 530 is an application that retrieves user-interface-related objects, such as object 505 and object 515, from object model 501 and determines whether the user-interface-related objects meet accessibility requirements, for example, by testing each object to determine whether it complies with a set of accessibility rules. In the implementation shown, accessibility check tool 530 reports the results of its determination via an error list 535, which may be transmitted as electronic data or otherwise conveyed to central product validation system 550. In one embodiment consistent with the invention, an automatic workflow can be configured to forward error reports to a responsible design or engineering team. In one embodiment, the central product validation system 550 can determine the responsible developer for the application part that caused an error on error list 535, and can initiate a bug-fixing workflow assigned to the developer.

The architecture shown in FIG. 5 allows tests to be run automatically at any time, and test results are reproducible as test scripts 555 and accessibility check tool 530 provide a stable test environment.

Figure 6:
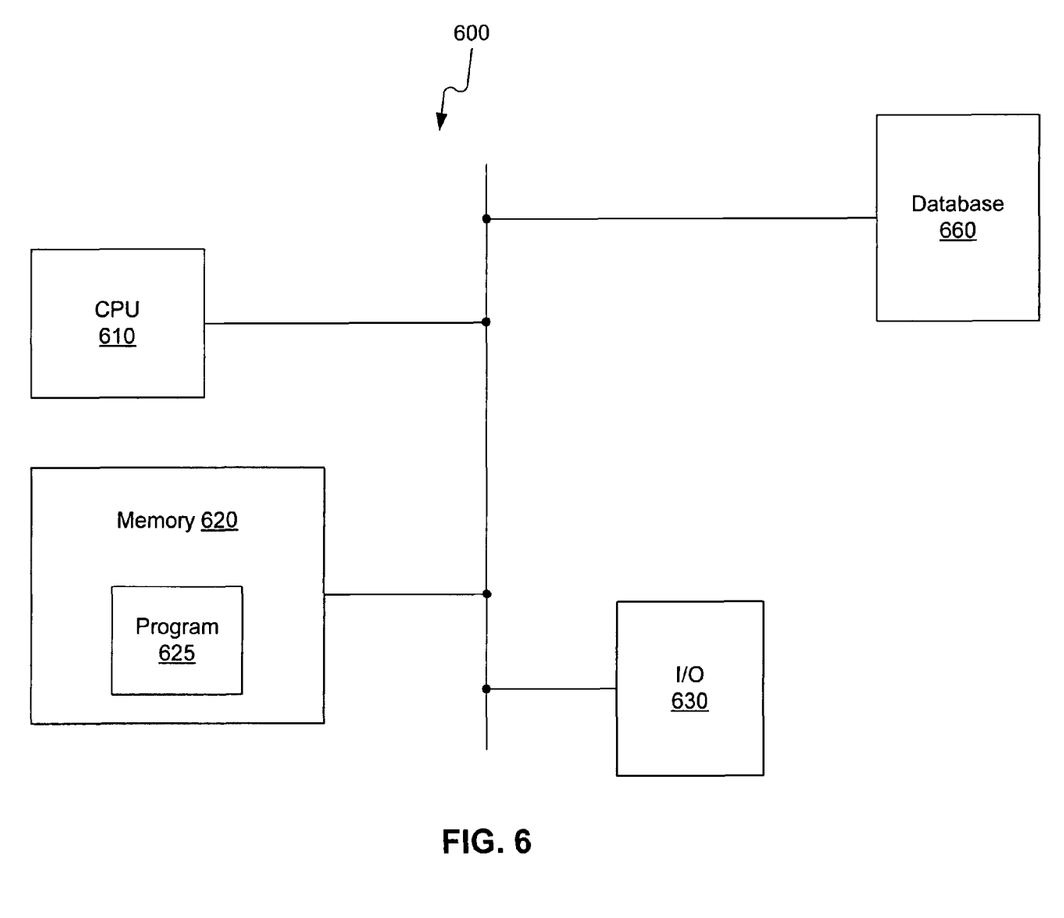
FIG. 6 illustrates an exemplary computing system 600 that can be used to implement embodiments of the invention.

FIG. 6 illustrates an exemplary computing system 600 that can be used to implement embodiments of the invention. The components and arrangement, however, are not critical to the present invention.

System 600 includes a number of components, such as a central processing unit (CPU) 610, a memory 620, an input/output (I/O) device(s) 630, and a database 660 that can be implemented in various ways. For example, an integrated platform (such as a workstation, personal computer, laptop, etc.) may comprise CPU 610, memory 620 and I/O devices 630. In such a configuration, components 610, 620, and 630 may connect through a local bus interface and access to database 660 (implemented as a separate database system) may be facilitated through a direct communication link, a local area network (LAN), a wide area network (WAN) and/or other suitable connections. For another example, system 600 may be part of a larger central product validation system.

CPU 610 may be one or more known processing devices, such as a microprocessor from the Pentium family manufactured by Intel™. Memory 620 may be one or more storage devices configured to store information used by CPU 610 to perform certain functions related to embodiments of the present invention. Memory 620 may be a magnetic, semiconductor, tape, optical, or other type of storage device. In one embodiment, memory 620 includes one or more programs 625 that, when executed by CPU 610, perform various processes consistent with the present invention. For example, memory 620 may include a accessibility check tool program that test an object model to determine whether a software application complies with accessibility requirements, such as the Section 508 accessibility standards. Memory 620 may also include other programs that perform other functions, such as a program that runs a test script to exercise an application object model during testing.

Methods, systems, and articles of manufacture consistent with the present invention are not limited to programs configured to perform dedicated tasks. For example, memory 620 may be configured with a program 625 that performs several functions when executed by CPU 610. That is, memory 620 may include an application accessibility test program that incorporates the functions of an accessibility check tool, a test script execution tool, and a central product validation system. Alternatively, CPU 610 may execute one or more programs located remotely from system 600. For example, system 600 may access one or more remote programs that, when executed, perform functions related to embodiments of the present invention.

Memory 620 may be also be configured with an operating system (not shown) that performs several functions well known in the art when executed by CPU 610. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 630 may comprise one or more input/output devices that allow data to be received and/or transmitted by system 600. For example, I/O device 630 may include one or more input devices, such as a modem, network connection, keyboard, touch screen, mouse, and the like, that enable data to be input, including data from a user. Further, I/O device 630 may include one or more output devices, such as a modem, network connection, display screen, CRT monitor, LCD monitor, plasma display, printer, speaker devices, and the like, that enable data to be output or presented, including presentation to a user. The configuration and number of input and/or output devices incorporated in I/O device 630 are not critical to the invention.

Database 660 may comprise one or more databases that store information and are accessed and/or managed through system 600. By way of example, database 660 may be an Oracle™ database, a Sybase™ database, or other relational database, or database 660 may be part of a central product validation system. Systems and methods of the present invention, however, are not limited to separate databases or even to the use of a database, and can include systems that use data from practically any source, such as the internet and other organized collections of data, or memory systems.

One of ordinary skill in the art will also recognize that the implementations described and suggested above can be implemented using conventional equipment and programming techniques.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for testing an application having source code for accessibility, the method being executed by a computer system and comprising:
providing a set of accessibility rules to test accessibility of the application for a user with a disability;
analyzing, by using a processor of the computer system, the source code of the application;
generating an object model representing the application based on the source code analysis, the object model including a control object, semantic information defining a function of an object in the object model, and relationship information describing a static relationship and a dynamic relationship existing between the object and at least one additional object included in the object model;
testing the object by using the semantic information to determine compliance of the object and the corresponding function with the set of accessibility rules, the testing being performed independent of use of a HyperText Markup Language model of the application to determine whether the function of the object at run-time is in compliance with the set of accessibility rules, wherein testing the object and the corresponding function includes using the semantic information to navigate a function call from the control object to the object;
determining based on the object model whether a screen element is a table element or a non-table element;
testing the screen element based on a first rule selected from the set of accessibility rules when the screen element is determined to be a table element, wherein the screen element is tested based on a second rule selected from the set of accessibility rules when the screen element is determined to be a non-table element, the second rule being different from the first rule;
determining whether a condition is present based on the result of the testing of the object; and
performing additional testing of the object when the condition is present, wherein the additional testing includes determining whether the object corresponds to a graphic and whether description text corresponding to the graphic is to be displayed at run-time of the application.

2. The method of claim 1, further comprising:
modifying the source code of the application corresponding to the object based upon the result of the testing.

3. The method of claim 1, wherein testing further comprises:
varying the testing on the object based on a context of the object in the object model.

4. The method of claim 1, wherein the application is an application that generates a web page.

5. The method of claim 1, wherein the set of accessibility rules are based on Section 508 of the Rehabilitation Act.

6. The method of claim 1, wherein generating an object model comprises:
limiting the object model to a plurality of objects that generate user interface elements.

7. A computer system, including a processor and a memory, for testing for accessibility an application having source code comprising:
a component for analyzing the source code of the application;
a component for generating an object model representing the application based on the source code analysis, the object model including a control object semantic information defining a function of an object in the object model, and relationship information describing a static relationship and a dynamic relationship existing between the object and at least one additional object included in the object model;
a component for testing the object by using the semantic information to determine compliance of the object and the corresponding function with the set of accessibility rules, the testing being performed independent of use of a HyperText Markup Language model of the application to determine whether the function of the object at run-time is in compliance with the set of accessibility rules, wherein testing the object and the corresponding function includes using the semantic information to navigate a function call from the control object to the object;

a component for determining based on the object model whether a screen element is a table element or a non-table element;

a component for testing the screen element based on a first rule selected from the set of accessibility rules when the screen element is determined to be a table element, wherein the screen element is tested based on a second rule selected from the set of accessibility rules when the screen element is determined to be a non-table element, the second rule being different from the first rule;

a component for determining whether a condition is present based on the result of the testing of the object; and a component for performing additional testing of the object when the condition is present, wherein the additional testing includes determining whether the object corresponds to a graphic and whether description text corresponding to the graphic is to be displayed at run-time of the application.

8. The computer system of claim 7, further comprising:
a component for identifying the source code of the application corresponding to the object if the object does not comply with the set of accessibility rules.

9. The computer system of claim 7, further comprising:
a component for varying the testing on the object based on a context of the object in the object model.

10. The computer system of claim 7, further comprising:
a component for limiting the object model to a plurality of objects that generate user interface elements.

11. A computer program product tangibly embodied in a computer-readable storage medium and comprising instructions which, when executed on a processor, causes the processor to perform a method for testing an application having source code for accessibility, the method comprising:
analyzing the source code of the application;
generating an object model representing the application based on the source code analysis, the object model including a control object semantic information defining a function of an object in the object model, and relationship information describing a static relationship and a dynamic relationship existing between the object and at least one additional object included in the object model;
testing the object by using the semantic information to determine compliance of the object and the corresponding function with the set of accessibility rules, the testing being performed independent of use of a HyperText Markup Language model of the application to determine whether the function of the object at run-time is in compliance with the set of accessibility rules, wherein testing the object and the corresponding function includes using the semantic information to navigate a function call from the control object to the object;
determining based on the object model whether a screen element is a table element or a non-table element;
testing the screen element based on a first rule selected from the set of accessibility rules when the screen element is determined to be a table element, wherein the screen element is tested based on a second rule selected from the set of accessibility rules when the screen element is determined to be a non-table element, the second rule being different from the first rule;
determining whether a condition is present based on the result of the testing of the object; and
performing additional testing of the object when the condition is present, wherein the additional testing includes determining whether the object corresponds to a graphic and whether description text corresponding to the graphic is to be displayed at run-time of the application.

12. The computer program product of claim 11, further comprising code for causing a processor to perform operations comprising:
identifying the source code of the application corresponding to the object if the object does not comply with the set of accessibility rules.

13. The computer program product of claim 11, further comprising code for causing a processor to perform operations comprising:
varying the testing on the object based on a context of the object in the object model.

14. The computer program product of claim 11, further comprising code for causing a processor to perform operations comprising:
limiting the object model to a plurality of objects that generate user interface elements.

15. A product validation system comprising:
an object model generator being executed on a first processor, the object model generator analyzing source code of a software application and generates an object model representing the application, the object model including a control object semantic information defining a function of an object in the object model, and relationship information describing a static relationship and a dynamic relationship existing between the object and at least the control object;
an accessibility checking tool being executed on the first processor or on a second processor to:
test the object by using the semantic information to determine compliance of the object and the corresponding function with a set of accessibility rules, wherein the test is performed independent of use of a HyperText Markup Language model of the application to determine whether the function of the object at run-time is in compliance with the set of accessibility rules, and testing the object and the corresponding function includes using the semantic information to navigate a function call from the control object to the object;
determine based on the object model whether a screen element is a table element or a non-table element;
test the screen element based on a first rule selected from the set of accessibility rules when the screen element is determined to be a table element, wherein the screen element is tested based on a second rule selected from the set of accessibility rules when the screen element is determined to be a non-table element, the second rule being different from the first rule;
determine whether a condition is present based on a result of the testing of the object; and
perform additional testing of the object when the condition is present, wherein the additional testing includes determining whether the object corresponds to a graphic and whether description text corresponding to the graphic is to be displayed at run-time of the software application; and
an application object model exerciser being executed on one of the first processor, the second processor, or a third processor to operate the object model such that essentially all objects from the object model are tested by the accessibility checking tool.

16. The system of claim 15, wherein the application model exerciser comprises:
a data processing system executing a test script.

17. The system of claim 15, wherein:
a source code identifier reports the test result to the object model generator; and
the object model generator identifies the source code of the application corresponding to an object that does not comply with the set of accessibility rules.

18. The system of claim 15, wherein the accessibility checking tool varies the tests on an object based on a context of the object in the object model.

19. The system of claim 15, wherein the object model generator limits the object model to a plurality of objects that generate user interface elements.

20. The system of claim 15, further comprising:
a product test controller that receives the test result from the accessibility checking tool and guides the operation of the application object model exerciser.

* * * * *